United States Patent [19]
Takahashi et al.

[11] Patent Number: 5,222,601
[45] Date of Patent: Jun. 29, 1993

[54] PACKAGE OF ROLLED PHOTOSENSITIVE MATERIAL

[75] Inventors: Hisashi Takahashi; Shigehisa Shimizu; Takayuki Fujiwara; Satoshi Mino; Masashi Aoki, all of Minami-Ashigara, Japan

[73] Assignee: Fuji Photo Film Co., Ltd., Minami-Ashigara, Japan

[21] Appl. No.: 884,060

[22] Filed: May 14, 1992

Related U.S. Application Data

[63] Continuation of Ser. No. 571,987, Aug. 24, 1990, abandoned.

Foreign Application Priority Data

Aug. 25, 1989 [JP] Japan ............... 1-98505[U]
Feb. 16, 1990 [JP] Japan ............... 2-13739[U]

[51] Int. Cl.$^5$ ............................................. B65D 85/67
[52] U.S. Cl. ................................... 206/416; 206/414
[58] Field of Search ............... 206/316.1, 389, 397, 206/403, 407, 408, 410, 413–416, 455; 242/71.1

[56] References Cited

U.S. PATENT DOCUMENTS

| | | | |
|---|---|---|---|
| 3,234,024 | 2/1966 | Leinonen | 206/407 X |
| 3,402,809 | 9/1968 | Snyder | 206/410 |
| 3,797,647 | 3/1974 | Frishman | 206/413 |
| 4,148,395 | 4/1979 | Syracuse et al. | 206/414 |
| 4,505,387 | 3/1985 | Seto | 206/414 |
| 4,733,777 | 3/1988 | Van Geyte et al. | 206/408 X |
| 4,826,008 | 5/1989 | Cloosterman | 206/413 |
| 4,858,762 | 8/1989 | Kewin | 206/414 |
| 4,911,299 | 3/1990 | Peeters | 206/410 |

FOREIGN PATENT DOCUMENTS

| | | | |
|---|---|---|---|
| 181417 | 5/1986 | European Pat. Off. | |
| 1231132 | 9/1960 | France | |
| 60-13386 | 1/1985 | Japan | |
| 0191046 | 9/1923 | United Kingdom | 206/316.1 |

Primary Examiner—Bryon P. Gehman
Attorney, Agent, or Firm—Burns, Doane, Swecker & Mathis

[57] ABSTRACT

Packages of a rolled photosensitive material comprise a core and a photosensitive material wound around the core, and one package further comprises a light-shielding leader connected with an end of the photosensitive material to shield the circumferential surface of the photosensitive material from light and a pair of light-shielding covers adhered to both sides of the leader in a peelable state to shield the side surfaces of the photosensitive material. Another package further comprises a light-shielding leader connected with an end of the strip material to shield the circumferential surface of the photosensitive material from light and a pair of side light-shielding covers adhered to shield both sides of the rolled photosensitive material so that the joining end substantially conforms to a boundary between the circumferential surface and the side surface of the photosensitive material, wherein at least one of the light-shielding leader and the side light-shielding cover is made of a tearable material in the boundary direction.

2 Claims, 12 Drawing Sheets

PACKAGE OF ROLLED PHOTOSENSITIVE MATERIAL

This application is a continuation of application Ser. No. 07/573,987, filed Aug. 24, 1990, now abandoned.

BACKGROUND OF THE INVENTION

1. Field of the Invention

This invention relates to a package of a rolled photosensitive material for loading in a light room.

2. Description of the Prior Art

A package of a rolled photosensitive material for loading in a light room is loaded into a magazine with a light-shielding ability. The light-shielding ability is broken in the magazine, and the photosensitive strip material is extended through the slit of the magazine.

A conventional package of a rolled photosensitive material is shown in an exploded perspective view of FIG. 38 (Japanese Patent KOKAI No. 60-13386). In the drawing, a photosensitive strip material 2 is coiled around the core 1. A leader 3 is connected with an end portion of the photosensitive strip material 2 by a joining tape 4, and a light-shielding paper 6 is adhered to the upper surface of the leader 3. The side end portion 10 having cut lines 5 of the paper 6 protrudes from the side ends of the leader 3. The end of the leader 3 is fixed with an adhesive tape 8, and circular covers 7 are joined to the core 1 with an adhesive 9. The side end portions 10 of the light-shielding paper are folded onto the circular covers 7 to adhere thereto with an adhesive.

A package having an opaque heat shrinkable film is known as a light-shielding material (EPA 181417).

However, in the case of the above conventional package of a rolled photosensitive material having circular covers, it is composed of two members, i.e. the light-shielding paper and the circular covers for light-shielding. Therefore, many processes for packaging are necessary such as punching the circular cover and the adhesion of the circular cover to the core, the packaging is troublesome and automatted packaging is difficult. Moreover, since the circular cover is formed out of a sheet material, the yield is low and the material cost is high.

In the case of the package having the opaque heat shrinkable film, it is difficult to impart light-shielding to the heat shrinkable film. Moreover, since the light-shielding of the inside the core is secured by the deformation of the heat shrinkable film, the light-shielding is not enough. Besides, a leader is necessary for tearing the opaque heat shrinkable film which increases the material cost.

SUMMARY OF THE INVENTION

An object of the invention is to provide a package of a rolled photosensitive material the packaging work of which is inexpensive and very easy.

Another object of the invention is to provide a package of a photosensitive strip material which can be applied to automatic manufacturing.

Another object of the invention is to provide a package of a photosensitive strip material wherein the photosensitive strip material is easily and surely extended from a magazine or the like.

The invention has been made in order to achieve the object, and a photosensitive material is packaged therein.

Thus, the present invention provides a package of a photosensitive strip material which comprises a core, a photosensitive strip material coiled around the core, a light-shielding leader connected with an end of the photosensitive strip material to shield the circumferential surface of the photosensitive strip material from light and a pair of light-shielding covers adhered to both sides of the light-shielding leader in a peelable state to shield the side surfaces of the photosensitive strip material.

The present invention also provides a package of a rolled photosensitive material which comprises a core, a photosensitive strip material coiled around the core, an integrated light-shielding cover connected with an end of the photosensitive strip material having a circumferential light-shielding portion to shield the circumferential surface of the photosensitive strip material, a pair of side light-shielding portions to shield the side surfaces of the photosensitive strip material and an end portion and a cutting means joined so that a side end substantially conforms to a boundary between the circumferential light-shielding portion and the side light-shielding portion.

The present invention further provides package of a photosensitive strip material which comprises a core, a photosensitive strip material coiled around the core, a light-shielding leader connected with an end of the photosensitive strip material to shield the circumferential surface of the photosensitive strip material from light and a pair of side light-shielding covers adhered to shield both sides of the photosensitive strip material so that the joining end substantially conforms to the boundary between the circumferential surface and the side surface of the photosensitive strip material, wherein at least one of the light-shielding leader and the side light-shielding cover is made of a tearable material in the boundary direction.

DETAILED DESCRIPTION OF THE INVENTION

Figure 1:
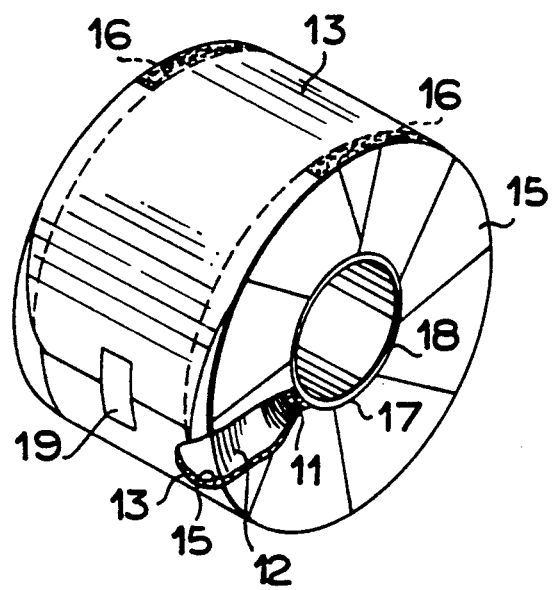
FIG. 1 is a perspective view of an embodiment of the package of a photosensitive strip material of the invention partially broken away.
Figure 2:
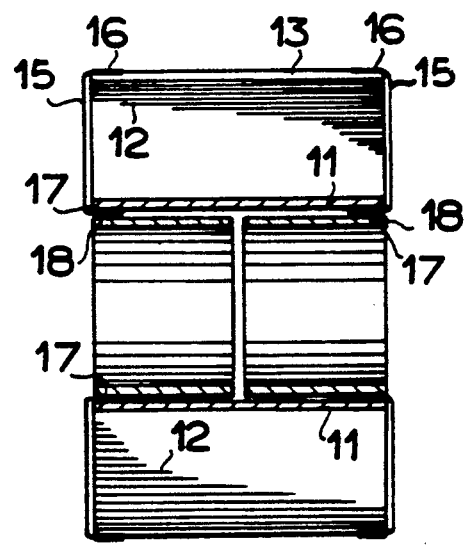
FIG. 2 is a sectional view.
Figure 3:
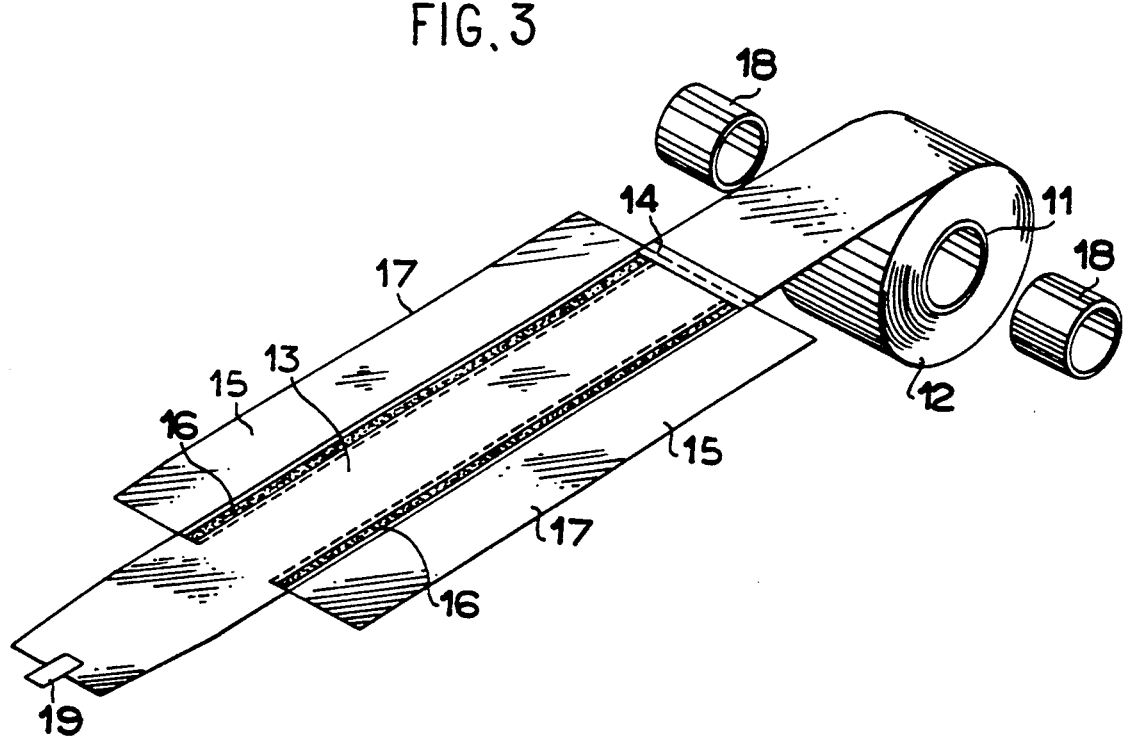
FIG. 3 is an exploded perspective view.
Figure 4:
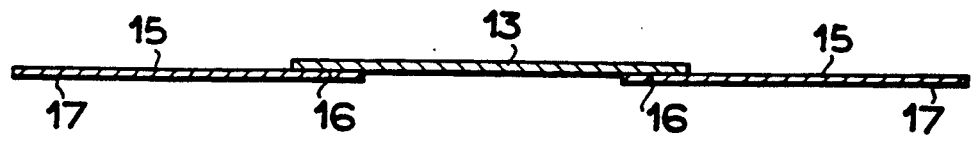
FIG. 4 is a sectional view of a light-shielding leader thereof, respectively.

In an embodiment of the package of the invention like shown in FIG. 1, light-shielding cover is adhered to the light-shielding leader in peelable state therefrom at the time of a extending it, and the adhesion method may be any method capable of forming such an adhesive strength such as heat sealing, ultrasonic adhesion or the adhesion using an adhesive.

The light-shielding leader shields mainly the circumferential surface of the rolled photosensitive material from light, and the light-shielding cover shields mainly the side surface of the rolled photosensitive material. The boundary (edge) between the circumferential surface and the side surface is shielded by the light-shielding leader and/or the light-shielding cover corresponding to the embodiment of adhesion. At that time, in order to increase light-shielding ability of the boundary portion, it is preferred that the boundary portion is multiplied by folding at least one of the light-shielding leader or the light-shielding cover or doubling the light-shielding leader.

The light-shielding leader and the light-shielding cover need to have light-shielding ability, moistureproofness and physical strength which do not affect the photosensitive material adversely, and they may be made of various films such as a polyethylene film containing a light-shielding material such as carbon black. The light-shielding leader and the light-shielding cover may be made of the same material.

In another embodiment of the package of the invention like shown in FIG. 8, the integrated light-shielding cover is made of a tearable material such as a paper, a stretched film containing carbon black, including the same materials as the light-shielding leader and the side light-shielding cover described later. The side edge of the cutting means needs substantially to conform to the boundary between the circumferential surface portion and the side surface portion. Two cutting means are provided at both sides of the boundary or one cutting mean is provided all around the circumferential surface portion.

Figure 15:
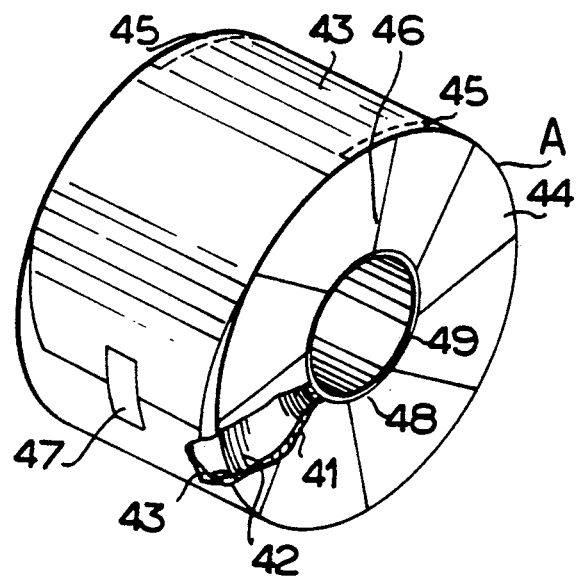
FIG. 15 is a perspective view of another embodiment of the package of a photosensitive strip material of the invention partially broken away.
Figure 16:
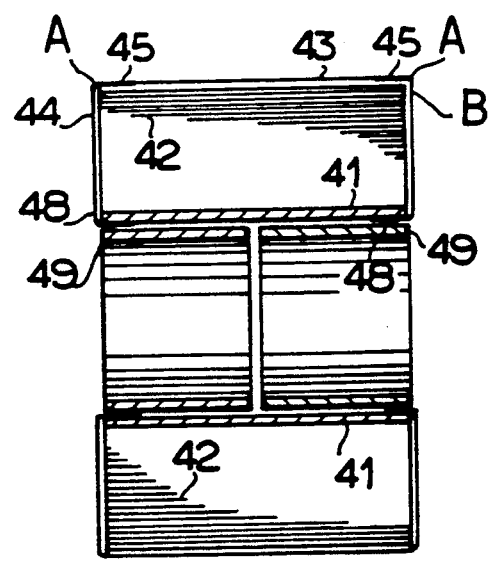
FIG. 16 is a sectional view.
Figure 17:
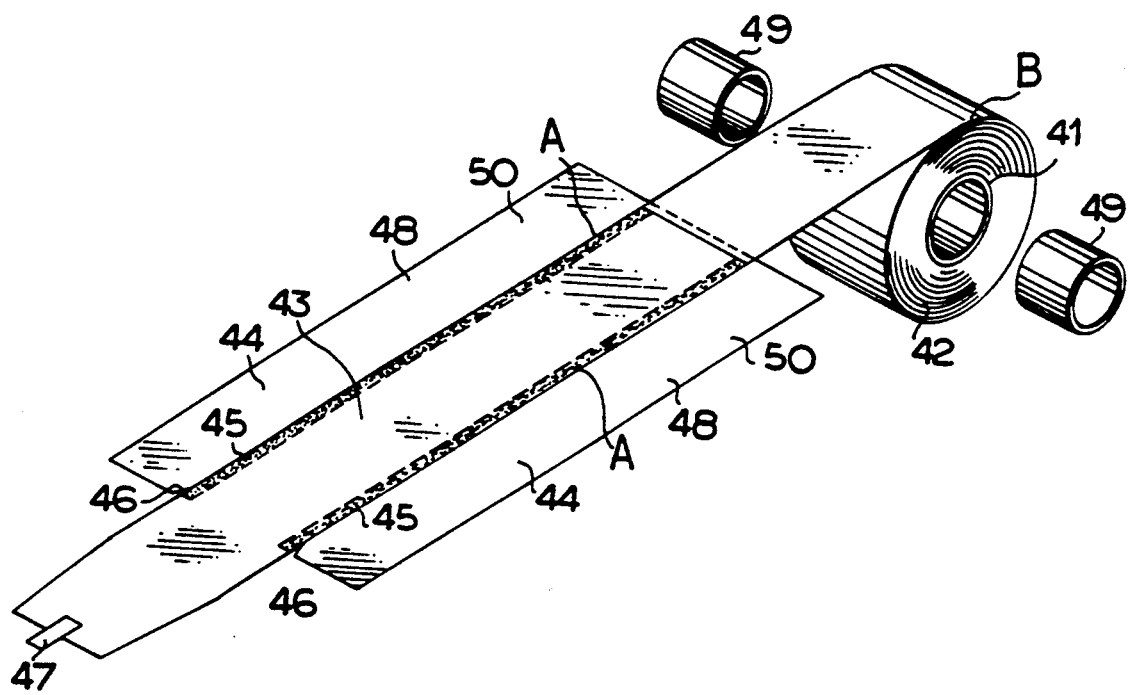
FIG. 17 is an exploded perspective view.
Figure 18:
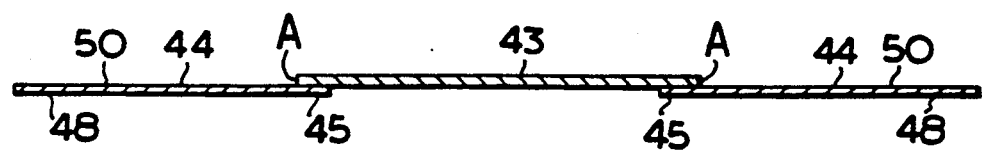
FIG. 18 is a sectional view of a light-shielding paper thereof, respectively.

In another embodiment of the package of the invention like shown in FIG. 15, the side light-shielding cover is adhered to both sides of the light-shielding leader, and the boundary substantially conforms to the boundary between the circumferential surface and the side surface of the rolled photosensitive material. At least, one of the light-shielding leader and the side light-shielding cover is made of a tearable material in the boundary direction. The light-shielding leader or side light-shielding cover is torn along the boundary between the light-shielding leader and the side light-shielding cover. In the boundary, there are two boundaries, i.e. the outside adhesion boundary and the inside adhesion boundary. The light-shielding leader or the light-shielding cover should be torn along the outside adhesion boundary, since the adhesion portion has a great physical strength while a force pulling inside in addition to a shearing force acts when the light-shielding leader is pulled. While, when the inside adhesion boundary lies around the boundary of the photosensitive strip material, the light-shielding leader is torn.

In the case that the side light-shielding cover is torn along the outside adhesion boundary, if the adhesion boundary lies on the circumferential surface of the photosensitive strip material, a part of the side light-shielding cover is projected from the circumferential surface after extending the light-shielding leader. To the contrary, when the adhesion boundary lies on the side surface, the force extending the light-shielding leader does not act as the tearing force on the side light-shielding cover along the adhesion boundary effectively. As a result, the force for extending is high, or the side light-shielding cover can not be torn. Therefore, the adhesion boundary should lie on the boundary between the circumferential surface and the side surface.

The light-shielding leader and the side light-shielding cover are joined together by using any method capable of obtaining a sufficient adhesive strength such as heat sealing or ultrasonic adhesion. The light-shielding leader may be joined to the upper or lower side of the side light-shielding cover.

The light-shielding leader and the side light-shielding cover may be made of various films having light-shielding ability, moistureproofness and physical strength which do not affect the photosensitive strip material adversely, and having tearability in one direction. Such a film includes unstretched films and molecularly oriented films such as uniaxially molecularly oriented thermoplastic resin films, unstretched thermoplastic resin inflation films having a small blow up ratio. Moreover, the light-shielding leader and the side light-shielding cover may be composed of a single layer film or a multilayer film.

The light-shielding leader and the side light-shielding cover are usually made of a thermoplastic resin. A preferable resin contains less volatile components which affect a photographic photosensitive material adversely, and is flexible so as to make the package easily, even if a light-shielding material is contained. Moreover, it is preferred that the physical strength is great, and the film formation is easy. The resin can be joined to the photosensitive strip material by heat sealing, ultrasonic adhesion, high-frequency adhesion or the like without using an adhesive tape, and the cost is low. The light-shielding leader and the side light-shielding cover made of thermoplastic resin is composed of, for example, a composition containing 30 to 90 wt. % of homopolyethylene resin and/or ethylene-α-olefin copolymer resin having 0.1 to 15.0 g/10 minutes of a melt index and 0.940 to 0.970 g/cm$^3$ of a density, or a composition containing 9 to 69 wt. % of ethylene-α-olefin copolymer resin and/or homopolyethylene resin having 0.1 to 50 g/10 minutes and 0.870 to 0.940 g/cm$^3$ of a density. Moreover, ethylene copolymer resin described below may be used.

When the light-shielding leader and the side light-shielding cover are formed of a multilayer film it is preferred to provide a molecularly oriented film layer for tearing easily and further to provide a film layer composed of one or more resins selected from homopolyethylene resin, ethylene-α-olefin copolymer resin, propylene-α-olefin copolymer resin and ethylene copolymer resins described below, having a thickness less than 70% of the total thickness for preventing the occurrence of pinholes and breakage.

Representative examples of the ethylene copolymer resins are described below.

Ethylene-vinyl acetate copolymer resin, ethylene-propylene copolymer resin, ethylene-1-butene copolymer resin, ethylene-butadiene copolymer resin, ethylene-vinyl chloride copolymer resin, ethylene-methyl methacrylate copolymer resin, ethylene-methyl acrylate copolymer resin, ethylene-ethyl acrylate copolymer resin (EEA), ethylene-acrylonitrile copolymer resin, ethylene-acrylic acid copolymer resin, ionomer resins (copolymer resins of ethylene and unsaturated acid which is crosslinked with metal such as zinc), ethylene-α-olefin copolymer resin (L-LDPE resin), ethylene-propylene-butene-ternary copolymer resin, modified polyolefin resins.

Among the ethylene copolymer resins, L-LDPE resin and EEA resin are preferred, because they are excellent in film moldability, heat sealability and dispersion of colored material and great in bag breakage strength, impact puncture strength and tear strength.

The linear low density polyethylene (L-LDPE) resin is called a third type of polyethylene resin, and it is a low cost high strength resin, having the advantages of both low, medium-density polyethylene resin and high-density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferable α-olefins have a number of carbon atoms of 4 to 10, and examples of the α-olefin are butene-1, 4-methylpentene-1, hexene-1, heptene-1 and octene-1. The density is usually in the range of 0.87 to 0.95 g/cm$^3$. Most of the L-LDPE resin is synthesized by low pressure method, and partly synthesized by modified high pressure method.

Preferable L-LDPE resins have 0.5 to 15 g/10 minutes (ASTM D-1238) of a melt index (MI) and 0.870 to 0.945 g/cm$^3$ (ASTM D-1505) of a density. The number of carbon atoms of the α-olefin is 6 to 8, and the resin is produced by the liquid process or the vapor process in view of physical strength and heat seal strength. Preferable examples of commercial L-LDPE resin are "Ultzex" (Mitsui Petrochemical Industries), "Stamilex" (DSM), "Dowlex" (Dow Chemical), "TUFLIN" (UCC) and "TUFTHENE" (Nippon Unicar).

A light-shielding material is blended, or a light-shielding film such as a metal foil, metallized film or a light-shielding paper is laminated, in order to add the light-shielding ability to the light-shielding leader and the light-shielding cover. Example of the light-shielding materials are described below.

Inorganic Compounds

Oxides . . . Silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montomorillonite, bentonite, etc.

Carbons . . . carbon black, graphite, carbon fiber, carbon hollow bead, etc.

Others . . . iron powder, copper powder, lead powder, tin powder, stainless steel powder, pearl pigment, aluminum powder, aluminum flakes, molybdenum sulfide, boron fiber, silicon carbide fiber, aluminum fiber, stainless steel fiber, nickel fiber, brass fiber, potassium titanate, lead titanate zirconate, zinc borate, barium metaborate, calcium borate, sodium borate, aluminum paste, etc.

steel fiber, nickel fiber, brass fiber, potassium titanate, lead titanate zirconate, zinc borate, barium metaborate, calcium borate, sodium borate, aluminum paste, etc.

Organic Compounds: wood flour such as pine, oak and sawdust, husk fiber such as almond, peanut and chaff, colored various fibers such as cotton, jute, paper piece, cellophane piece, nylon fiber, polypropylene fiber, starch, aromatic polyamide fiber, etc.

Among them, preferred light-shielding materials yield opacity, and light-absorptive carbon black, titanium nitride and graphite are particularly preferred because of being excellent in heat resistance and light resistance and being relatively inactive.

Carbon blacks are divided into gas black, oil furnace black, channel black, anthracene black, acetylene black, ketschen carbon black, thermal black, lamp black, vegetable black and animal black according to their origin. Among these, furnace carbon black is preferable in terms of light-shielding character, cost and improvement of properties. On the other hand, since acetylene black and Ketschen carbon black have an antistatic character, they are also preferable, though they are expensive. They may be blended to the furnace black in order to improve its character.

The blending form of the light-shielding material roughly divided as follows:

Uniformly Colored Pellet

Color compound.

Powder Dispersion

Dry color, treated with various surface-treating agents and ground with dispersion assistant to fine granules.

Paste

Light-shielding material is dispersed into a plasticizer or the like.

Liquid

Liquid color, which is liquid composed of a light-shielding material dispersed in a surfactant.

Masterbatch Pellet

Light-shielding material dispersed in a plastic resin to be colored in a high concentration.

Lubricative Granule Powder

Light-shielding material dispersed in a plastic resin in high concentration, and formed in granule or powder form.

Dry Powder

Usual powder without treatment.

As the form of the light-shielding material, there are powder coloring agent, paste coloring agent, wet coloring agent, masterbatch pellets, dye, colored pellets, etc. Though, there are various blending method, the masterbatch method is preferred in view of cost and the contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU No. 43-10362 discloses another method of making a masterbatch by dispersing the carbon black into polyethylene. Particularly preferable carbon black for the packaging material for photographic photosensitive materials is the oil furnace carbon black having a pH of 6 to 9, a mean particle size of 10 to 120 m$\mu$, a volatile components content of less than 2% and an oil absorption value of more than 50 ml/100 g in view of rare occurrence of photosensitivity deviation, great light-shielding ability and rare occurrence of lumps of carbon black and fish eyes.

An antistatic agent and a conductive material may be added in the light-shielding leader and the light-shielding side cover in order to prevent the occurrence of static marks or the like. Representative examples of the antistatic agent and the conductive material are described below.

Nonionic surfactants (representative component is a polyoxyethylene glycol), anionic surfactants (representative component is a polyoxyethylene glycol), cationic surfactants (representative component is a quarternary ammonium salt), amphoteric surfactants, alkyl amine derivatives, various lubricants, carbon black, graphite, metal surface-coating pigments metal powders, metal flakes, carbon fiber, metal fibers, whiskers (potassium titanate, aluminum nitride, alumina).

Representative examples of the nonionic surfactants are described below. Polyethylene glycol fatty acid esters, polyoxyethylene sorbitan fatty acid esters, polyoxyethylene fatty alcohol ethers, polyoxyethylene alkyl phenyl ethers, polyoxyethylene glycerine fatty esters, polyoxyethylene fatty amines, sorbitan mono-fatty acid ester, fatty acid pentaerythritols, ethylene oxide adducts of fatty alcohols ethylene oxide adducts of fatty acids, fatty amino or fatty amide ethylene oxide adducts, alkyl phenol ethyene oxide adducts, alkyl naphthol ethylene oxide adducts, partially fatty acid-esterified polyol ethylene oxide adducts, various nonionic antistatic agents disclosed on page 120 of Japanese Patent KOKOKU No. 63-26697.

Representative examples of the anionic surfactant are described below. Sodium ricinoleic acid sulfate ester, various fatty acid metal salts, sodium ricinoleate ester sulfate ester, sulfated oleic acid ethylaniline, olefin sulfate ester salts, oleyl alcohol sulfate ester sodium salt, alkyl sulfate ester salts, fatty acid ethylsulfonates, alkyl sulfonates, alkylnaphthalene sulfonates, alkylbenzene sulfonates, succinate ester sulfonates, phosphate esters.

Representative examples of the cationic surfactants are described below. Primary amine salts, tertiary amine salts, quarternary ammonium salts, pyridine derivatives.

Representative examples of the ampholytic surfactants are described below. Carboxylic acid derivatives, imidazoline derivatives, betaine derivatives.

To add an antioxidant to the light-shielding leader or the side light-shielding cover is preferred in order to prevent occuring lumps of carbon black and fish eyes. Suitable antioxidants are described below.

Phenol Antioxidants 6-t-butyl-3-methylphenol derivatives, 2,6-di-t-butyl-p-cresol, 2,2'-methylenebis-(4-methyl-6-t-butylphenol), 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol), 4,4'-butylidenebis(3-methyl-6-t-butylphenol), stearyl-$\beta$-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3(3',5'-di-t-butyl-4'-hydroxyphenyl)propionate]methane, etc.

Ketone-Amine Condense Antioxidants 6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants

Phenyl-$\alpha$-naphthylamine, N-phenyl-$\beta$-naphthylamine, N-phenyl-N'-isopropyl-p-phenylenediamine, N,N'-diphenyl-p-phenylenediamine, N,N'-di-$\beta$-naphtyl-p-phenylenediamine, N-(3'-hydroxybuylidene)-1-naphthylamine, etc.

Imidazole Antioxidants 2-mercaptobenzolimidazole, zinc salt of 2-mercaptobenzoimidazole, 2-mercaptomethylbenzoimidazole, etc.

Phosphite Antioxidants

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants

Thiourea derivatives, 1,3-bis(dimethylaminopropyl)-2-thiourea, etc.

Other Antioxidants

Those useful for air oxidation, such as dilauryl thiodipropionate, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.).

A suitable content of the antioxidant is 0.01 to 1.0 wt. %.

To add a lubricant to the light-shielding leader or the light-shielding cover is preferred. Suitable lubricants are described below.

Oleic Acid Amide Lubricants

"ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic Acid Amide Lubricants "ALFLOW S-10" (Nippon Oil and Fats Co., Ltd.), etc.

Stearic Acid Amide Lubricants

"ALFLOW S-10" (Nippon Oil and Fats Co., Ltd.), "NEWTRON 2" (Nippon Fine Chemical Co., Ltd.), "DIAMID 200 BIS" (Nippon Kesei Chemical Co., Ltd.), etc.

Bis Fatty Acid Amide Lubricants

"BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone Lubricants dimethylpolysiloxanes, etc. (Shinetsu Chemical Co., Ltd., Toray Silicone Co., Ltd.), etc.

Alkyl Amine Lubricants

"ELECTROSTRIPPER TS-2", "ELECTROSTRIPPER TS-3" and "ELECTROSTRIPPER TS-5" (Kao Corp.), etc.

Palmitic Amide Lubricants

Behenic Amide Lubricants

BNT (Nippon Fine Chemical Co., Ltd.)

Methylenebis Steroid Amide Lubricants

Among them, higher fatty amides such as a saturated straight chain fatty amide or unsaturated mono fatty amide of $C_8$ to $C_{22}$ is particularly preferred because of being cheap and having a great lubrication ability, and no occurrence of fogging photosensitivity deviation in photographic photosensitive materials.

Hydrocarbon Lubricants liquid paraffin, natural paraffin, microwax, synthetic paraffin, polyethylene wax, polypropylene wax, chlorinated hydrocatbon, fluorocarbon, etc.

Fatty Acid Lubricants higher fatty acids preferably more than $C_{12}$, hydroxy fatty acids, etc.

Ester Lubricants fatty acid lower alcohol esters, fatty acid polyol esters, fatty acid polyglycol esters, fatty acid fatty alcohol esters, etc.

Alcohol Lubricants polyols, polyglycols, polyglycerols, etc.

Metallic Soap metal salts such as Li, Mg, Ca, sr, Ba, Zn, Cd, Al, Sn, Pb salts of higher fatty acids such as lauric acid, stearic acid, ricinoleic acid, naphthenic acid, oleic acid, etc.

Suitable content of the lubricant is 0.005 to 5.0 wt. %, particularly in the case of using fatty amide lubricant which has a great lubrication ability and is liable to bleed out, the content is preferably 0.005 to 1.0 wt. %.

An antiblocking agent may be added to the light-shielding leader or the light-shielding side cover in order to prevent blocking. Suitable antiblocking agents are described below.

Silica, diatomaceous earth, talc, calcium silicate, aluminum silicate, magnesium silicate, calcium carbonate, polyvinyl esters of higher fatty acid, n-octadecylurea, dicarboxylic acid ester amides and N,N'-dioleylhydroxyamide, and various lubricants and light-shielding materials having antiblocking activity. Carbon black, fatty acid amide, silica, talc, calcium carbonate, metal powder, titanium dioxide and the like are particularly preferable. A preferred amount of the antiblocking agent is 0.01 to 7.0 wt. %.

Various additives may be added to the light-shielding leader or the light-shielding cover of the invention. Examples of the additives are described below.

(1) Plasticizer;
phthalic acid esters, glycol esters, fatty acid esters, phosphoric acid esters, etc.

(2) Stabilizer;
lead compounds, cadmium compounds, zinc compounds, alkaline earth metal compounds, organic tin compounds, etc.

(3) Flame retardant;
phosphoric acid esters, phosphiric acid ester halides, halides, inorganic materials, polyols containing phosphorus, etc.

(4) Filler;
alumina, kaolin, clay, calcium carbonate, mica, talc, titanium dioxide, silica, etc.

(5) Reinforcing agent;
glass lobing, metallic fiber, glass fiber, glass milled fiber, carbon fiber, etc.

(6) Blowing agent;
inorganic blowing agents (ammonium carbonate, sodium hydrogen carbonate), organic blowing agents (nitroso compounds, azo compounds), etc.

(7) Vulcanizing agent;
vulcanization accelerator, acceleration assistant, etc.

(8) Deterioration preventing agent;
ultraviolet absorber, antioxidant, metal deactivator, peroxide decomposing agent, etc.

(9) Coupling agent;
ailane compounds, titanium compounds, chromium compounds, aluminum compounds, etc.

(10) Nucleating agent;
organic nucleating agents (dibenzylidene sorbitol compounds, etc.), inorganic nucleating agents (calcium carbonate, etc.)

(11) Various thermoplastic resins, rubbers, etc.

Representative examples of the means for easily tearing the light-shielding leader and the light-shielding side cover are described below.

A: Single Layer Light-Shielding Thermoplastic Resin Film

Representative Means 1

A film of 50 to 200 μm in thickness containing 20 to 95 wt. % of polyethylene resin (containing ethylene-α-olefin copolymer resin in addition to homopolyethylene resin) having 0.1 to 15.0 g/10 minutes of a melt index and 0.941 to 0.970 g/cm$^3$ of a density, 0.5 to 10 wt. % of a granular light-shielding material, 5 to 80 wt. % of homopolyethylene resin having 0.1 to 5.0 g/10 minutes and 0.870 to 0.940 g/cm$^3$ of a density, a lubricant and/or an antistatic agent.

Representative Means 2

A film of 50 to 200 μm in thickness containing 20 to 95 wt. % of polyethylene resin (containing ethylene-α-olefin copolymer resin in addition to homopolyethylene resin) having 0.1 to 15.0 g/10 minutes of a melt index and 0.941 to 0.970 g/cm$^3$ of a density, 0.5 to 10 wt. % of a granular light-shielding material, 5 to 80 wt. % of an ethylene-α-olefin copolymer resin having 5 to 50 g/10 minutes of a melt index and 0.870 to 0.940 g/cm³ of a density, a lubricant and/or an antistatic agent.

B: Multilayer Coextruded Light-Shielding Thermoplastic Film.

Representative Means 3

A multilayer coextruded film of 30 to 200 μm in thickness of which more than 30% is a molecularly oriented polyethylene resin containing more than 50 wt. %, preferably more than 70 wt. %, particularly preferably more than 90 wt. %, of homopolyethylene resin and/or an ethylene-α-olefin copolymer resin having 0.1 to 15.0 g/10 minutes of a melt index and 0.941 to 0.970 g/cm³ of a density, having at least one layer containing a light-shielding material.

Representative Means 4

A multilayer coextruded film of 30 to 200 μm in thickness wherein the layer shown in Representative Means 1 or 2 is more than 50% of the whole thickness.

C: Film Wherein A Flexible Sheet is Laminated to an Uniaxially Molecularly Oriented Thermoplastic Resin Film.

Representative Means 5

A film wherein a thermoplastic resin layer containing a conductive carbon black or a furnace carbon black, an antistatic agent and/or a conductive material is coated onto at least one side of an uniaxially molecullarly oriented (including uniaxially stretched) thermoplastic resin film.

Representative Means 6

A film wherein a light-shielding thermoplastic resin film is laminated onto at least one side of an uniaxially molecularly oriented (includes uniaxially stretched) thermoplastic resin film through an adhesive layer.

Representative Means 7

An uniaxially stretched (longitudinally or laterally) thermoplastic resin film containing a light-shielding material.

Representative Means 8

An uniaxially stretched (longitudinally or laterally) multilayer coextruded thermoplastic resin film containing a light-shielding material in at least one layer.

Representative Means 9

A thermoplastic resin film comprising a metallized film.

Representative Means 10

A film wherein a thermoplastic resin film or a thermoplastic resin coating layer is laminated onto the film shown in Representative Means 9 through an adhesive layer or directly.

Representative Means 11

A film wherein a thermoplastic resin film (an uniaxially molecularly oriented film, a biaxially molecularly oriented film or an unstretched film) containing a light-shielding material and/or a light-shielding paper is laminated onto a metallized uniaxially molecularly orientated (longitudinally or laterally, including stretched) thermoplastic resin film through an adhesive layer.

A means for tearing easily is preferably provided around the boundary of the adhesive portion of the light-shielding leader or of the light-shielding side cover in order to tear easily along the boundary of the adhesive portion.

The means for tearing easily are, for example, a V-shape notch, a large number of very narrow notches, many indentations, perforations having a depth less than a half of the light-shielding film thickness, melting by laser beam, cutting, adhesion of a single face adhesive tape, streaks over the whole surface of the light-shielding film in the coiling direction, and the like.

The core and the photosensitive strip material may be conventional.

In an embodiment of the package of the invention like shown in FIG. 1, the photosensitive strip material is packaged by the light-shielding leader and the light-shielding cover being integrated, and the light-shielding leader is readily separated from the light-shielding cover at the time of extending the photosensitive strip material.

Figure 8:
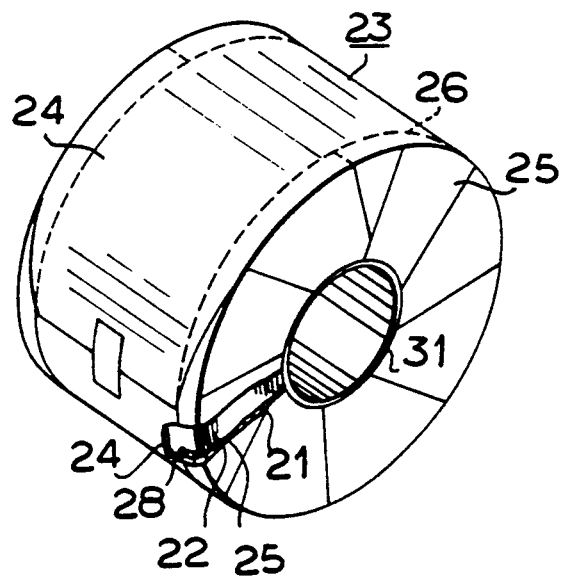
FIG. 8 is a perspective view of another embodiment of the package of a photosensitive strip material of the invention partially broken away.
Figure 9:
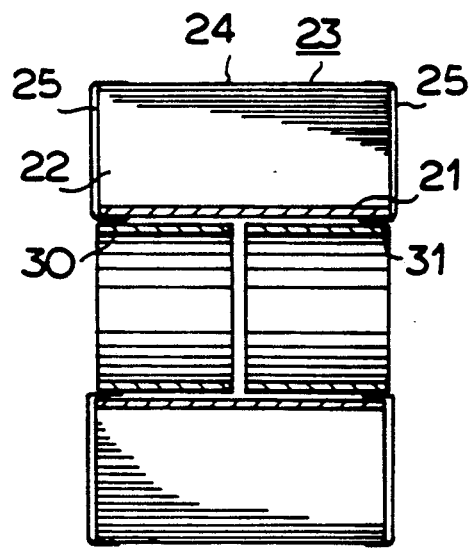
FIG. 9 is a sectional view.
Figure 10:
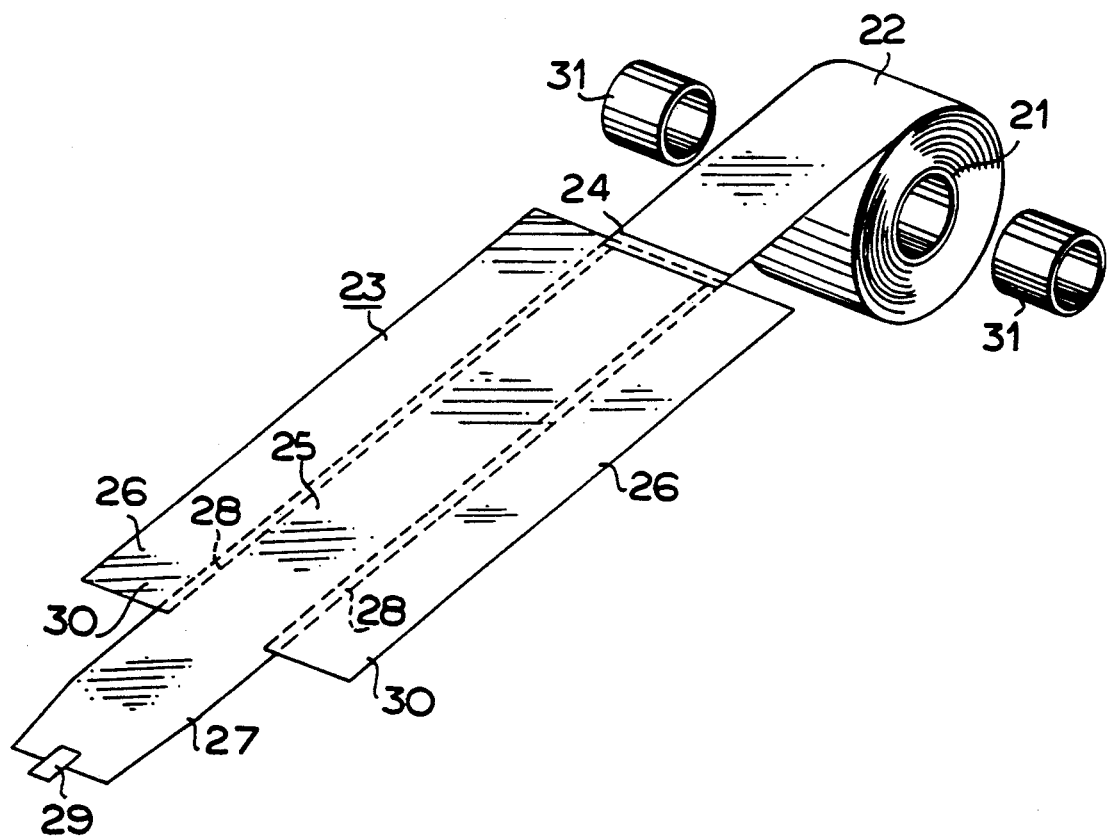
FIG. 10 is an exploded perspective view.
Figure 11:
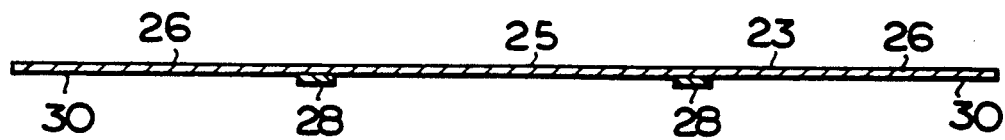
FIG. 11 is a sectional view of a integrated light-shielding paper thereof, respectively.

In another embodiment of the package of the invention like shown in FIG. 8, the photosensitive strip material is packaged by the integrated light-shielding cover to be shielded from light, and it is cut along the cutting member at the time of extending the photosensitive strip material to be separated into the circumferential light-shielding portion and leader portion and the side light-shielding portion.

In still another embodiment of the package of the invention like shown in FIG. 15, the photosensitive strip material is packaged by the integrated light-shielding leader and side light-shielding cover to be shielded from light, and at the time of extending the photosensitive strip material, the light-shielding leader or the side light-shielding cover is torn along the adhesion boundary between the light-shielding leader and the light-shielding cover.

EXAMPLES

An embodiment of the package of a rolled photosensitive material is shown in FIG. 1 to 7.

In FIG. 1 to 4, the numeral 11 indicates a core having a light-shielding ability, a photosensitive strip material 12 of 11.7 cm×90 m is wound around the core 11 and the roll of the photosensitive strip material is 76 mm in inner diameter and 185 mm in outer diameter. A light-shielding leader 13 made of a low density polyethylene resin containing 3 wt. % of a carbon black, and having 100 μm in thickness and a size of 11.7 cm×90 cm is connected with the end of the photosensitive strip material by using an adhesive tape 14. A pair of light-shielding covers 15 made of the same material as the light-shielding leader 13, and having 100 μm in thickness and a size of 11.7 cm×90 cm are connected with both sides of the leader 13 in a peelable state, and the overlapping portion of the leader 13 with the cover 15 is 20 mm in width and a heat sealing portion 16 at the center of the overlapping portion is 10 mm in width.

The light-shielding leader 13 is wound more than one time around the roll of the photosensitive strip material 12 and fixed with an end tape 19. The light-shielding cover 15 covers the side surface of the roll of the photosensitive strip material 12 and the edge portion 17 thereof is folded inside the core 11. Two paper cores 18 having 75 mm in outer diameter, 2 mm in thickness and 58 mm in width are inserted into the core 11 on both sides with pressure, and the edge part 17 of the light-shielding cover 15 is fixed between the core 11 and the fixing members 18.

Figure 5:
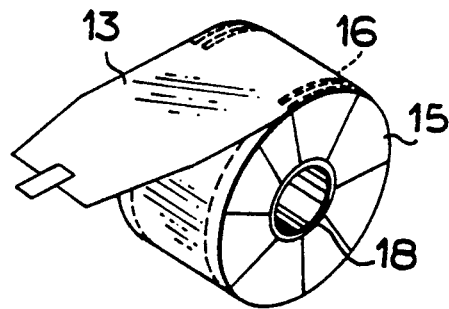
FIGS. 5 to 7 are perspective views illustrating the state of extending the photosensitive strip material.
Figure 6:
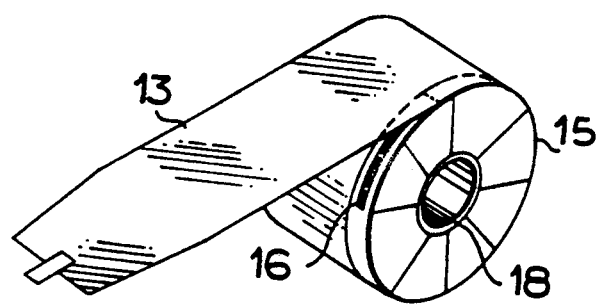

The extending action of the photosensitive strip material from a magazine is described below. When the package is loaded in a magazine (not illustrated), as shown in FIG. 5, the end of the light-shielding leader 13 is pulled to extend from the slit of the magazine. In the above state, when the light-shielding leader 13 is pulled, as shown in FIG. 6, the light-shielding leader 13 is peeled from the light-shielding cover 15 and pulled out from the slit. While, the light-shielding cover 15 remains on the side of the photographic strip material.

Figure 7:
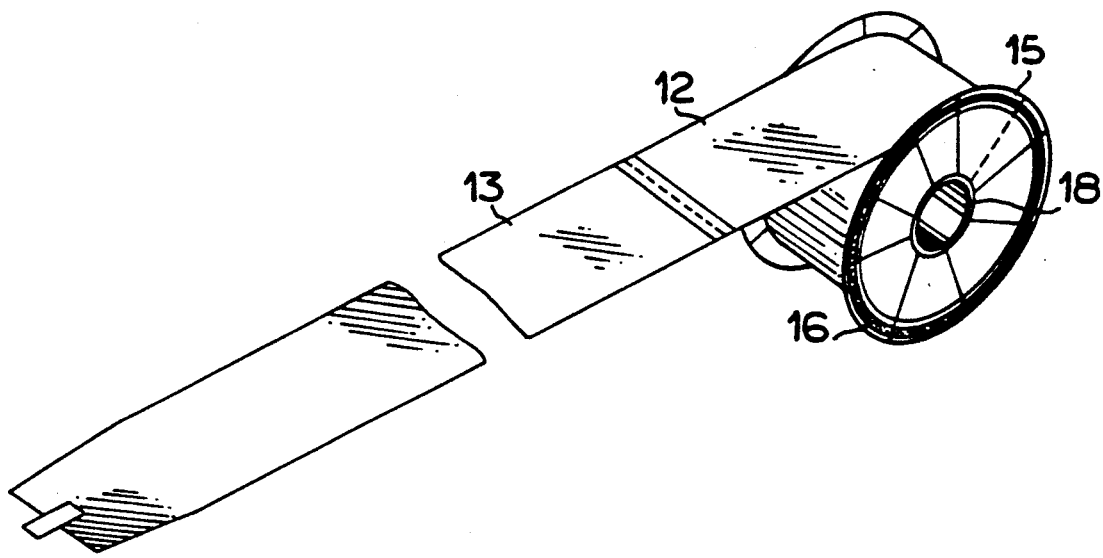

The light-shielding leader 13 is further pulled to be completely out of the magazine, as shown in FIG. 7, and the light-shielding leader 13 is completely peeled from the light-shielding cover 15 and completely separated from it. As a result, a load to the rotation of the roll of the photosensitive strip material is reduced.

Another embodiment of the package of a photosensitive strip material is shown in FIG. 8 to 14.

In FIG. 8 to 11, the numeral 21 indicates a core having a light-shielding ability, a photosensitive strip material 22 of 11.7 cm×90 m is wound around the core 21 and the roll of the photosensitive strip material is 76 mm in inner diameter and 185 mm in outer diameter. An integrated light-shielding cover 23 is connected with the end of the photosensitive strip material 21 by an adhesive tape 24. The integrated light-shielding cover 23 is composed of a rectangularly circumferential light-shielding portion 25, pair of side light-shielding portions 26 integrated with both sides of the circumferential light-shielding portion 25 and an end portion 27 projected from the circumferential light-shielding portion 25, and having 80 μm in thickness. Cutting members 28 composed of a polyethylene terephthalate film having 100 μm in thickness and a size of 10 mm×70 cm are adhered at both sides of the inner surface of the circumferential light-shielding portion 25, and the outer side edge of the cutting members 28 are the same as the boundary of the circumferential light-shielding portion and the side light-shielding portion. The circumferential light-shielding portion 25 is coiled one or more times around the roll of the photosensitive strip material 22 and the end portion 27 thereof is fixed by an end tape 29. The side light-shielding portions are folded to be covered on the side surface, and the end portion 30 thereof is folded inside the core 21. Two fixing members 31 are inserted into the core 21 in both sides with pressure, and the edge portion 30 of the side light-shielding portion 26 is fixed between the core 21 and the fixed member 31.

Figure 12:
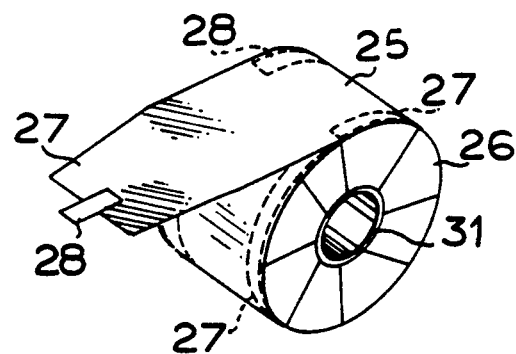
FIGS. 12 to 14 are perspective views illustrating the state of extending the photosensitive strip material.
Figure 13:
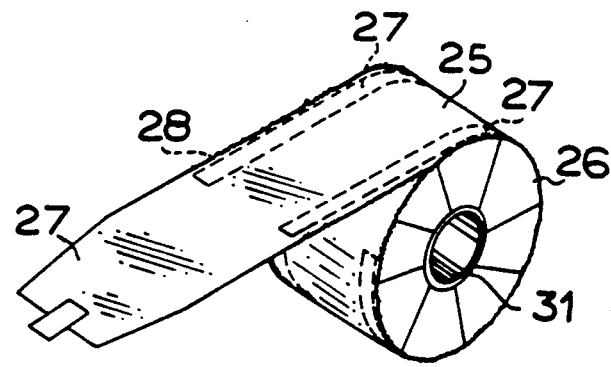

The extending action of the photosensitive strip material is described below. When the package is loaded in a magazine (not illustrated), as shown in FIG. 12, the end portion 27 of the integrated light-shielding cover 23 is pulled to extend from the slit of the magazine. In the above state, when the end portion 27 is pulled, as shown in FIG. 13, the integrated light-shielding cover 23 is torn along the side of the cutting members 28, i.e. the boundary between the circumferential light-shielding portion 25 and the side light-shielding portion 26. As a result, the circumferential light-shielding portion 25 can be pulled out of the magazine, while the side light-shielding portion 26 remains on the side of the photosensitive strip material 22.

Figure 14:
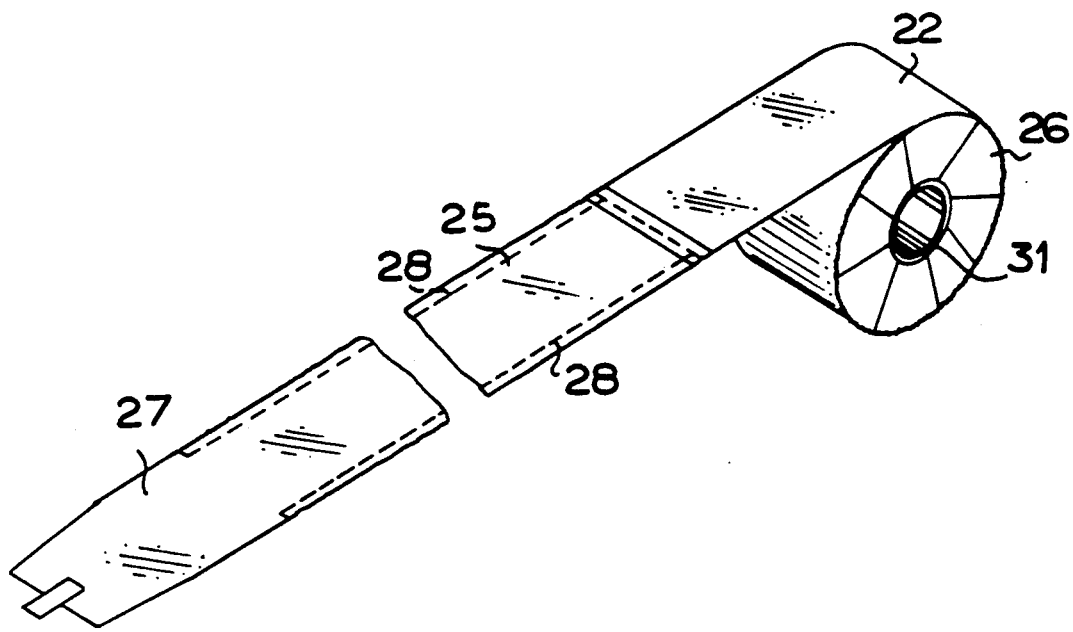

When the end portion 27 is further pulled to be completely out of the magazine, as shown in FIG. 14, the circumferential light-shielding portion 25 is torn and completely separated from the side light-shielding portion 26. As a result, a load to the rotation of the roll of the photosensitive strip material is reduced.

Still another embodiment of the package of a photosensitive strip material is shown in FIG. 15 to 21.

In FIG. 15 to 18, the numeral 41 indiates a core having a light-shielding ability, a photosensitive strip material 42 of 11.7 cm×90 m is wound around the core 41 and the roll of the photosensitive strip material 42 is 76 mm in inner diameter and 185 mm in outer diameter. A light-shielding leader 43 made of a low density polyethylene resin containing 3 wt. % of carbon black, and having 100 μm in thickness and a size of 11.7 cm×90 cm is adhered to the end of the photosensitive strip material 42. A light-shielding cover 44 composed of a high density polyethylene resin film and having 100 μm in thickness a size of 10.0 cm×70 cm is adhered onto each side of the light-shielding leader 43. The adhered heat sealed portions 45 are 10 mm in width. A notch 46 is formed at about an outer side edge of each the heat sealed portions 45 in the end of each of the side light-shielding covers 44.

The light-shielding leader 43 is wound once or more around the photosensitive strip material 42 and fixed with an end tape 47. The side light-shielding covers 44 cover each side surface of the roll of the photosensitive strip material 42 and the edge portions 48 thereof are folded inside the core 41. At that time, the adhesion boundaries A of the light-shielding leader 42 and the side light-shielding cover 44 lie almost along the boundary B of the circumferential surface and side surfaces of the photosensitive strip material 42. Two fixing members 49 having 75 mm in outer diameter, 71 mm in inner diameter, 2 mm in thickness and 58 mm in width are inserted into the core 41 in both sides with pressure, and the edge portion 48 of the side light-shielding cover 44 is fixed between the core 41 and the fixing member 49.

Figure 19:
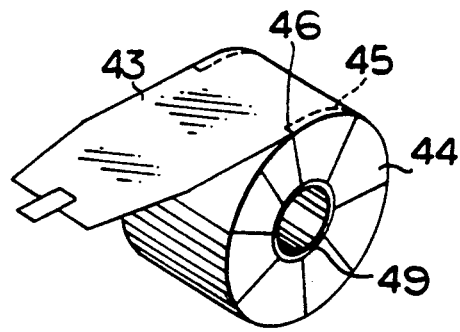
FIGS. 19 to 21 are perspective views illustrating the state of extending the photosensitive strip material.
Figure 20:
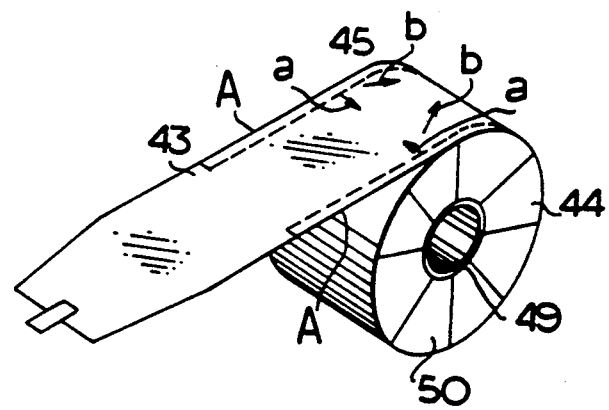
Figure 21:
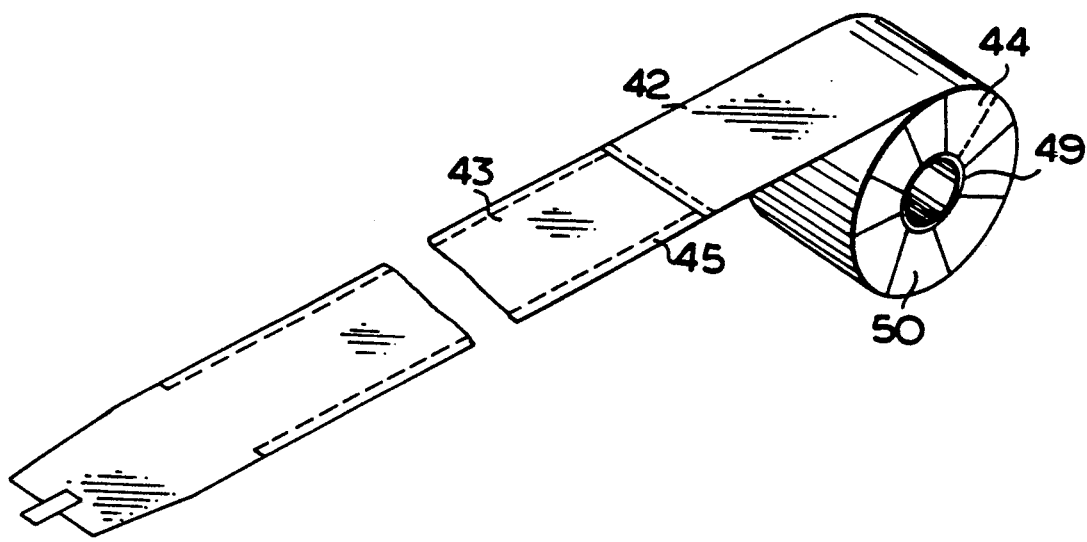

The extending action of the photosensitive strip material from a magazine is described below. When the package is loaded in a magazine (not illustrated), as shown in FIG. 19, the end of the light-shielding leader 43 is pulled to extend from the slit of the magazine. In the above state, when the light-shielding leader 43 is pulled, as shown in FIG. 20, a force pulling inside in addition to a shearing force acts at the notches 46 of the side light-shielding covers 44, since the light-shielding leader 43 is adhered inside each notch 46 and the adhesion portion has a great physical strength, the side light-shielding covers 44 are torn along the adhesion boundary A without being torn inside. As a result, the light-shielding leader 43 and the heat sealed portions 45 of the side light-shielding covers 44 are pulled out off the magazine, while the portions 50 of the side light-shielding covers 44 that is not heat-sealed remains on the sides of the photosensitive strip material 42. When the light-shielding leader 43 is further pulled from the slit to be completely out of the magazine, as shown in FIG. 21, the light-shielding leader 43 is completely separated from the side light-shielding covers 44, as a result, a load to rotation of the roll of the photosensitive strip material is reduced.

Figure 22:
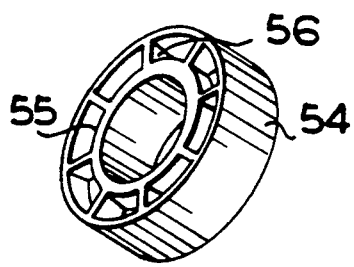
FIGS. 22 to 25 are perspective views of other examples of the fixing member to fix the end portion except a paper core.

A fixing member shown in FIG. 22 is made of a plastic resin and composed of a rim 54, boss 55 and an arm connecting them. The outer diameter of the rim 54 is slightly smaller than the inner diameter of the core 11, 21, 41, and the fixing member is inserted with pressure so that it is fixed.

Figure 23:
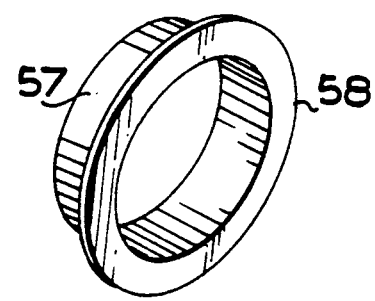

A fixing member shown in FIG. 23 is made of a plastic resin and composed of a tube portion 57 and a flange portion formed at the end of the tube portion 57. The outer diameter of the tube portion 57 is slightly smaller than the inner diameter of the core 11, 21, 41, and the fixing member is inserted with pressure so that it is fixed. In the fixing member, since the flange portion 58 covers a folded portion of the end portion 17, 30, 48, even if pinhole occurs at the folded portion, light-shielding is sufficiently obtained. Moreover, the fixing material is not inserted inside the core 11, 21, 41 by the flange portion 58.

Figure 24:
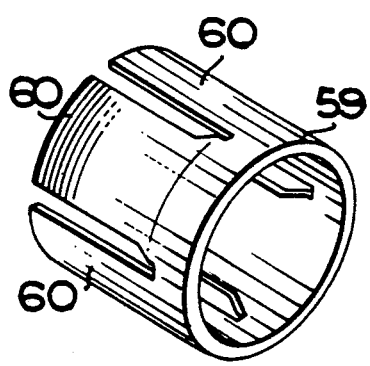

A fixing member shown in FIG. 24 is made of a plastic resin and composed of a tube portion 59 and four flexible plates 60 integrated with the tube portion 59. The outer diameter of the tube portion 59 is slightly smaller than the inner diameter of the core 11, 21, 41 and the outer diameter determined by the flexible plate 60 is slightly longer than the inner diameter of the core 11, 21, 41, and the fixing material is sufficiently fixed in the core 11, 21, 41 by pressure of the flexible plates 60.

Figure 25:
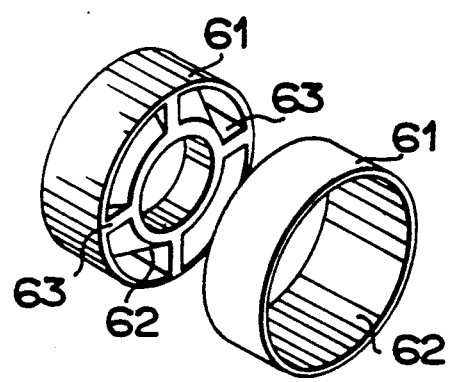

A fixing member shown in FIG. 25 is made of a plastic resin and composed of a rim 61, a boss 62 of which a outer diameter is same as the diameter of the rim 61 and a diameter gradually come to be short from the outer side to the inner side, and an arm 63 connecting them. The outer diameter of the rim 61 is slightly smaller than the inner diameter of the core 11, 21, 41, and the fixing member is fixed with pressure. In the fixing member, a hole of the boss 62 is formed in the shape of a funnel, therefore the fixing member is not easily caught with fingers, a insertion of fingers into the hole is prevented. As a result the fixing member is not pulled out with fingers.

Figure 26:
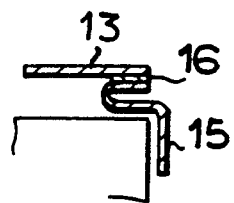
FIGS. 26 to 37 are sectional views illustrating of forms joining a light-shielding leader to a light-shielding cover.

In the example shown in FIG. 26, the end of the light-shielding cover 15 is folded outside, the outer surface of the folded portion is adhered to the light-shielding leader 13 by heat-sealing.

Figure 27:
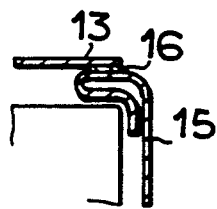

In the example shown in FIG. 27, the end of the light-shielding is folded inside, the upper surface of the folded portion which is on the circumferential surface of the photosensitive strip material is adhered to the light-shielding leader 13 by heat sealing.

Figure 28:
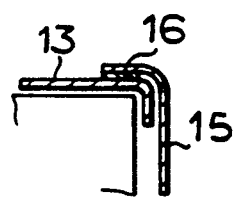

In the example shown in FIG. 28, the end of the light-shielding cover 15 which is on the photosensitive strip material is adhered to near the end of the light-shielding leader 13 by heat sealing.

Figure 29:
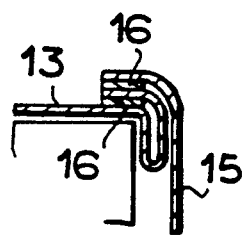

In the example shown in FIG. 29, the end of the light-shielding leader 13 is folded outside, the upper face of the folded portion which is on the circumferential surface of the photosensitive strip material 12 is adhered to the end of the light-shielding cover 15.

Figure 30:
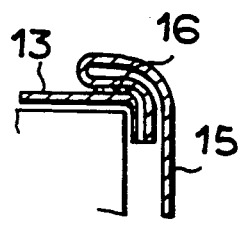

In the example shown in FIG. 30, the end of the light-shielding cover 15 is folded inside, the lower surface of the folded portion is adhered to the light-shielding leader 13.

Figure 31:
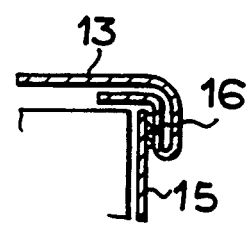

In the example shown in FIG. 31, the end of the light-shielding leader 13 is folded inside, the inner surface of the folded portion which is on the side surface of the photosensitive strip material 12 is adhered to the end of the light-shielding cover by heat sealing.

Figure 32:
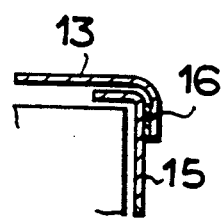

In the example shown in FIG. 32, the inner end surface of the light-shielding leader 13 which is on the side surface of the photosensitive strip material 12 is adhered to near the end of the light-shielding cover by heat sealing.

Figure 33:
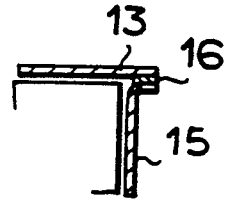

In the example shown in FIG. 33, the end of the light-shielding cover 15 is folded outside at about 90 degrees, the upper surface of the folded portion is adhered to the end of light-shielding leader 13 by heat sealing.

Figure 34:
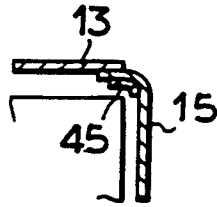

In the example shown in FIG. 34, the end of the light-shielding cover 15 is folded inside at about 90 degrees, the folded portion lies on the end of the light-shielding leader 13, and they are connected with each other by adhesive tape 45 at the lower surface thereof.

Figure 35:
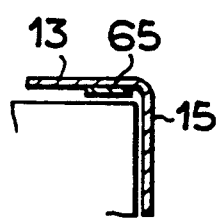

In the example shown in FIG. 35, the light-shielding cover 15 is folded inside at about 90 degrees and the end surface of the folded light-shielding cover is faced to the end surface of the light-shielding 13, and the adhesive tape 65 is adhered to the lower surfaces thereof.

Figure 36:
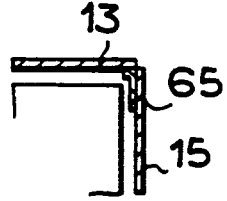

In the example shown in FIG. 36, the light-shielding leader 13 faces the light-shielding cover at about right angles, the adhesive tape 65 is adhered to the inner surfaces thereof.

Figure 37:
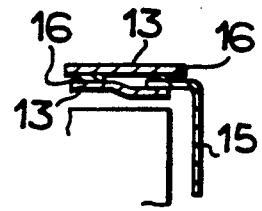
Figure 38:
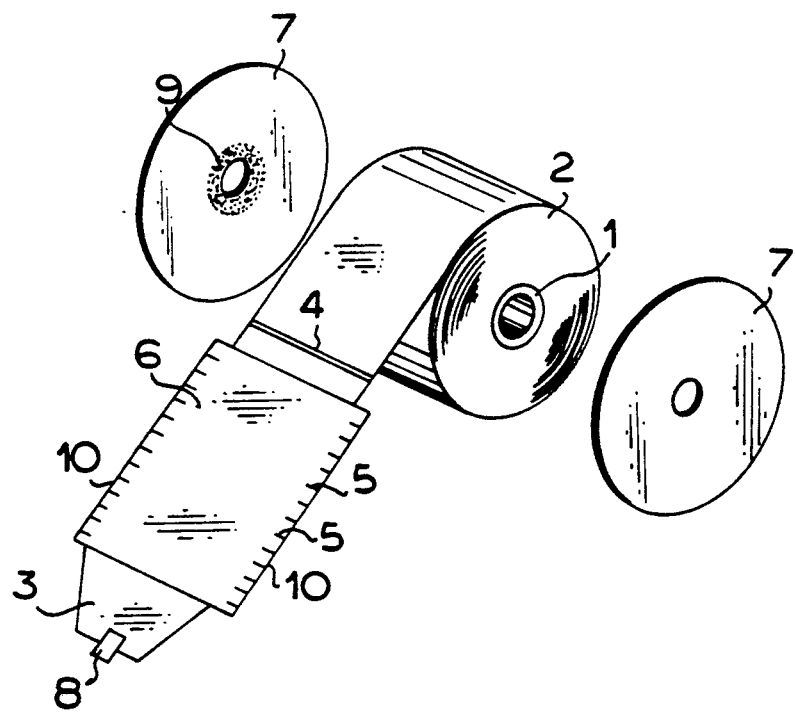
FIG. 38 is an exploded perspective view of a conventional package.

In the example shown in FIG. 37, the end of the light-shielding cover 15 is arranged between the ends of the light-shielding leader 13,13 and adhered to them in a peelable state, and the ends of the light-shielding leader 13,13 are sufficiently adhered at midpoint.

We claim:

1. A package of a rolled photosensitive material which comprises a core, a photosensitive strip material wound around the core, a light-shielding leader having an inner side and an outer side and being connected with an end of the photosensitive strip material to shield a circumferential surface of the photosensitive strip material from light and a pair of separate side light-shielding covers for fully shielding both sides of the rolled photosensitive material, each of said light-shielding covers being rectangular in shape and being adhered to the inner surface of a side edge of said light-shielding leader along an adhesion boundary which substantially conforms to a boundary defined by the circumferential surface of the photosensitive strip material and a side surface of the photosensitive strip material, wherein the side light-shielding covers are made of a tearable material along the adhesion boundary.

2. A package of a rolled photosensitive material according to claim 1, wherein the side light-shielding covers are fixed within the core by a pair of fixing members of which the outer diameter is slightly smaller than the inner diameter of the core.

* * * * *